United States Patent Office 2,699,995
Patented Jan. 18, 1955

2,699,995

PROCESS FOR PREPARING WHEY FOOD

Maurice E. Hull, La Grange, Ill., assignor to Armour and Company, Chicago, Ill., a corporation of Illinois No Drawing. Application March 17, 1951, Serial No. 216,267

7 Claims. (Cl. 99—57)

My invention relates to the preparation of a useful whey food. More particularly, my invention relates to a simple method of concentrating condensed milk whey, from which lactose has been removed, without burning or congealing.

An important object of my invention is to provide a method of stabilizing a milk whey liquor so that it may be concentrated to a predetermined solids content without burning or congealing. Another object of my invention is to provide an economical method of utilizing milk whey, from which lactose has been removed, as a raw material in the preparation of a desirable food product having good keeping qualities. Other objects and advantages will be apparent as this specification proceeds.

Milk whey, also known as milk serum, is that part of milk remaining after coagulation and separation of the curd. The principal constituents of whey are water, lactose, and protein. Raw whey alone has little economic value, but by further processing it may be made into valuable products such as condensed whey, powdered whey, lactose, whey protein, and the like.

I have discovered a new and useful method of preparing a food product in which I utilize the residue remaining after lactose is separated from condensed milk whey. One such method of separating lactose from whey as disclosed in U. S. Patent 2,467,453 is as follows: Milk whey having a protein content unstable to heat and having a pH of from about 5.4 to 6.8 is neutralized with an alkali such as sodium hydroxide to a pH of about 7 to 7.5. An alkali metal tetraphosphate is added to the neutralized whey in an amount varying from about 0.0025% to about 0.06% by weight of the neutralized whey. The whey is concentrated in accordance with conventional methods to a total solids content of from about 50 to about 65%. Lactose is then crystallized from the whey concentrate, and the resulting lactose crystals are removed as by centrifuging or filtering. As much as 75% of the original lactose content may be isolated by this tetraphosphate method.

Another method of separating lactose from whey, well known in the art, is by direct crystallization. In this method, lactose is crystallized from highly condensed whey and is separated in any convenient way, usually by centrifuging. The direct crystallization method requires a relatively long crystallization period, 18 to 36 hours as against 4 to 8 hours required in the tetraphosphate method described above. My invention contemplates the use of the whey residue or concentrate obtained by either of these methods or any other suitable method of concentrating milk whey and separating lactose therefrom.

After removal of the crystallized lactose from milk whey, the residue cannot then be concentrated in conventional vacuum apparatus without congealing, discoloring, burning or scorching on the evaporator heating surfaces long before the desired percentage of solids is attained. A whey residue which has been burned in this manner is unfit for food purposes, and for this reason it has been heretofore impossible to prepare a satisfactory condensed whey food by concentrating condensed milk whey from which lactose has been removed.

I have discovered that if I mix an oleaginous substance with the whey residue remaining after separation of lactose from concentrated fresh milk whey, I may then concentrate the mixture to a suitable solids concentration without burning.

In my process I may concentrate fresh milk whey in any suitable evaporating apparatus, preferably at about 26 inches vacuum and at a pan temperature of about 125 to 140° F., and preferably until the total solids content is from about 50 to 65%. The condensed whey may then be conveniently cooled, as for example in a cooling vat held at about 70° F., until there is no further crystallization of lactose. The lactose crystals may then be removed from the whey concentrate as by centrifuging or filtering. The residue comprises water, protein, and dissolved lactose, and the total solids content of the residue may be about 40% or less.

In the next step I subject the residue to a procedure which conditions it for subsequent concentration. This procedure involves the addition of a small amount of the oleaginous substance to the whey residue. Suitably the oleaginous substance may comprise about 5% of the weight of the conditioned residue. Much higher percentages of the oleaginous substance may be used, as for example 30 or 40%, but I prefer to use only about 12 to 14%. The following are specific examples of substances which may be used for this purpose: coconut oil, soy bean oil, peanut oil, oleo oil, lard, mineral oil, butter and butterfat. My process is not limited to the use of these substances, however, as any edible oleaginous substance will serve. Also I prefer to add sucrose to the whey residue.

For optimum results I find it better to add to the residue a quantity of water prior to the final mixing of the oleaginous substance, and this is especially important when in the initial concentration of the whey the solids content is brought to 30% or more (determined after removal of lactose crystals).

Following the addition of the oleaginous substance and the water and sucrose, the residue may be mixed to a uniform consistency by any convenient mixing method. For this purpose I prefer to homogenize the residue after warming it to about 120° F. After mixing, the residue is a light-colored, homogeneous syrup.

The whey residue thus treated is then concentrated, in the same manner as in the first concentration, to a total solids content suitable for preservation, at the same time desirably stopping short of a concentration at which sucrose has a tendency to crystallize. Thus the residue may be conveniently concentrated to about 70 to 80% or more total solids. Residues having about 76% total solids may be kept under seal at room temperature for at least a year without mold growth or gaseous fermentation.

The concentrated whey residue is characterized by a pleasing taste and appearance and as a food is desirable for many purposes. In particular, the residue may be used as an ingredient in bakery products, ice cream, caramel candies and the like.

The following specific example illustrates my process:

A quantity of fresh milk whey is concentrated in a Rogers coil pan at a temperature of 140° F. and 26 inches vacuum to a total solids content of 62%. The concentrated whey is cooled to 70° F. until lactose crystallization is complete. Lactose crystals are removed from the whey by centrifuging, leaving a residue which has a 38.6% total solids content. 5540 grams of this residue are mixed with 2832 grams of sucrose and 501 grams of oleo oil, warmed to 120° F. and homogenized. The homogenized mixture is then concentrated to 80.1% total solids in a vacuum pan at 140° F. and 26 inches of vacuum. The product is a sweet, light-colored, thick paste which has a creamy taste and a smooth texture.

Other modifications of my process as herein described, all of which are within the spirit of my invention, will readily occur to those skilled in the art.

I claim:

1. In a process for concentrating partially delactosed whey liquor, the steps of standardizing said liquor to a total solids level of about 30% by weight, adding from 5 to 40% by weight of an oleaginous substance thereto, mixing a quantity of sugar sufficient to prevent fermentation of the condensed product, heating the mixture under subatmospheric pressure to condense said mixture until the total solids content of said condensed product is between 70 and 80% by weight.

2. In a process for concentrating partially delactosed whey liquor having in excess of 30% by weight of total solids, the steps of standardizing said liquor to less than 30% of total solids by the addition of water, adding from 5 to 40% by weight of an oleaginous substance thereto, mixing a quantity of sugar sufficient to prevent fermentation of the condensed product, heating the mixture under subatmospheric pressure to condense said mixture until the total solids content of said condensed product is between 70 and 80% by weight.

3. The process of claim 2 wherein the oleaginous substance is oleo oil.

4. In a process for concentrating partially delactosed whey liquor having in excess of 30% by weight of total solids the steps of adjusting the total solids level to below 30% by the addition of water, adding from 5 to 20% by weight of an oleaginous substance thereto, adding sufficient sugar to prevent fermentation, homogenizing the mixture, heating the same under subatmospheric pressure to condense said homogenized mixture until a total solids content of between 70 and 80% by weight is attained.

5. In a process for concentrating partially delactosed whey liquor, the steps of adding from 5 to 20% by weight of an oleaginous substance, mixing sugar in an amount sufficient to prevent fermentation of the condensed product and heating the mixture under subatmospheric pressure to condense the total solids content of said mixture to between 70 and 80% by weight.

6. The process of claim 5 wherein the heating step is carried out at a temperature between 120 and 140° F. at a pressure of approximately 26 inches Hg.

7. In a process for concentrating partially delactosed whey liquor, the steps of adding an oleaginous substance thereto and heating the mixture under subatmospheric pressure to condense said mixture to a total solids content between 70 and 80% by weight.

References Cited in the file of this patent

UNITED STATES PATENTS

| | | |
|---|---|---|
| 442,593 | Rehnstrom | Dec. 9, 1890 |
| 1,600,573 | Bell | Apr. 15, 1926 |
| 2,119,614 | Webb et al. | Apr. 14, 1937 |
| 2,467,453 | Almy et al. | Jan. 11, 1946 |

OTHER REFERENCES

Journal of Dairy Science, vol. 31, No. 2, February 1948, pages 145, 150, 156.